(12) United States Patent
Burton et al.

(10) Patent No.: US 6,682,081 B2
(45) Date of Patent: Jan. 27, 2004

(54) REDUCED AREA GASKETS

(75) Inventors: Brian Douglas Burton, Chester, VA (US); James E. B. Frew, Kingsport, TN (US); Alfred F. Waterland, III, Chesterfield, VA (US)

(73) Assignee: Inertech, Inc., Monterey, CA (US)

( * ) Notice: Subject to any disclaimer, the term of this patent is extended or adjusted under 35 U.S.C. 154(b) by 35 days.

(21) Appl. No.: 09/984,591

(22) Filed: Oct. 30, 2001

(65) Prior Publication Data

US 2003/0080518 A1 May 1, 2003

(51) Int. Cl.$^7$ ................................................ F16L 17/03
(52) U.S. Cl. .................... 277/626; 277/602; 277/608; 277/612
(58) Field of Search ............................... 277/592, 596, 277/602, 608, 612, 626

(56) References Cited

U.S. PATENT DOCUMENTS

| | | | |
|---|---|---|---|
| 117,564 A | | 8/1871 | Kibler |
| 306,293 A | * | 10/1884 | Tennant ..................... 428/600 |
| 695,174 A | | 3/1902 | Roller |
| 1,171,295 A | * | 2/1916 | Young ........................ 277/608 |
| 1,942,704 A | * | 1/1934 | Hubbard ..................... 277/601 |
| 2,513,178 A | * | 6/1950 | Jackson ...................... 285/363 |
| 3,195,906 A | * | 7/1965 | Moyers ....................... 277/611 |
| 3,355,181 A | * | 11/1967 | Olson ......................... 277/611 |
| 3,480,301 A | * | 11/1969 | Kroening ..................... 285/119 |
| 3,656,769 A | | 4/1972 | Jelinek et al. |
| 3,738,670 A | * | 6/1973 | Jelinek et al. ............... 277/632 |
| 3,775,832 A | | 12/1973 | Werra |
| 3,781,043 A | | 12/1973 | Hagmann |
| 3,836,183 A | * | 9/1974 | Battle ......................... 285/363 |
| 4,535,996 A | * | 8/1985 | Cardis et al. ................ 277/596 |
| 4,758,028 A | * | 7/1988 | Davies et al. ................ 285/189 |
| 4,776,600 A | * | 10/1988 | Kohn .......................... 277/611 |
| 4,778,189 A | * | 10/1988 | Udagawa ..................... 277/648 |
| 4,795,166 A | | 1/1989 | Irmler |
| 4,943,070 A | | 7/1990 | Lang |
| 5,316,320 A | | 5/1994 | Breaker |
| 5,333,919 A | * | 8/1994 | Nerenberg ................... 285/363 |
| 5,362,115 A | * | 11/1994 | Carr ............................ 285/363 |
| 5,461,904 A | | 10/1995 | Baker |
| 5,472,214 A | * | 12/1995 | Wainer et al. ............... 277/609 |
| 5,531,454 A | * | 7/1996 | Borneby ...................... 277/591 |
| 5,564,715 A | * | 10/1996 | Wallace ....................... 277/612 |
| 5,581,019 A | | 12/1996 | Minor et al. |
| 5,611,549 A | * | 3/1997 | Forry .......................... 277/591 |
| 5,749,607 A | | 5/1998 | Carr |
| 5,758,882 A | | 6/1998 | Torzewski |
| 6,260,854 B1 | * | 7/2001 | Lemon ........................ 277/609 |
| 6,481,722 B1 | * | 11/2002 | Shaffer ........................ 277/609 |

* cited by examiner

*Primary Examiner*—Anthony Knight
*Assistant Examiner*—Enoch E Peavey
(74) *Attorney, Agent, or Firm*—John H. Thomas, P.C.

(57) ABSTRACT

A reduced area gasket has a sealing ring around the inside perimeter of the gasket. Remaining portions of the gasket are removed or compressed so that the bolt load is focused on the sealing area when the flange is tightened. In this way, the lower bolt loads mandated by plastic piping may be met, and the required sealing may be further obtained.

13 Claims, 7 Drawing Sheets

REDUCED AREA GASKETS

This invention relates to gaskets that are installed between pipes typically in industrial applications. Specifically, the invention is directed to reduced area gaskets for use in plastic piping systems.

BACKGROUND OF THE INVENTION

Plastic piping systems are prevalent throughout the chemical processing, waste treatment, pulp and paper and other industries. While the plastic pipe and flanges (FRP, PVC, CPVC, etc.) are chemically resistant to the media passing through the pipes, at a fraction of the cost of alloy metallic piping systems, the inherent mechanical properties of the plastic create sealing challenges beyond those inherent with metallic flanges/piping.

Plastic flanges are brittle and exhibit low allowable compressive stresses. As a result, the manufacturers of these piping and flange systems specify extremely low maximum allowable assembly bolt loads. Assembly bolt loads in excess of these limits can damage the flanges either through a compressive stress failure or brittle failure. The flanges are typically flat (with no raised face as with metallic flanges) with a wide variety of surface profiles across the flat face (grooves, serrations, smooth, etc.). To prevent cantilever loads and resulting brittle (bending) failure of the flanges, full face design gaskets are specified. A full face gasket extends from the inside diameter ("ID") of the flange to the outside diameter ("OD") of the flange with bolt holes matching those of the flange. The combination of the resulting large surface area gasket and low permissible bolt load creates a low compressive stress applied to the gasket material. Table 1 shows the surface stress developed on several, conventional full face gaskets when compressed between plastic pipe flanges at the manufacturer's specified assembly bolt load:

TABLE 1

Gasket Stress Developed

| Flange Size | Full Face Gasket Area | Allowable Bolt Torque | Assembly Stress Developed (f = .18) |
|---|---|---|---|
| NPS 2 × 150 | 22.2 in2 | 20 ft-lb | 385 psi |
| NPS 3 × 150 | 33.0 in2 | 20 ft-lb | 260 psi |
| NPS 8 × 150 | 80.4 in2 | 40 ft-lb | 350 psi |

Table 2 shows the minimum compressive stress required for various gasket materials to provide an impermeable seal:

TABLE 2

Compressive Stress Required For Various Gasket Materials

| Material | Minimum Required Assembly Stress |
|---|---|
| 40–60 durometer Elastomers (EPDM, Viton, Red Rubber, etc.) | 300 psi |
| ⅛" thick expanded PTFE (GORE-TEX ®, Inertex ®, etc.) | 2,800 psi |
| ⅛" thick virgin or mechanical grade PTFE | 3,500 psi |
| ⅛" thick filled PTFE | 4,800 psi |

The cause of poor sealing performance of plastic flanges is evident upon review of the two tables. Of all of the available, conventional gasket materials, only elastomers will receive the necessary compressive stress in plastic piping applications to effect a seal. All other materials require compressive stresses approximately ten times what is available with plastic flange and bolting specifications.

Wherever possible, elastomer type gaskets are typically used in plastic piping systems. They are inexpensive and they seal well with the low available bolt loads. The sealing challenges that are the focus of this invention are applications with plastic piping systems where elastomer gaskets are not chemically or thermally compatible with the process media. In these applications, conventional elastomer gaskets would be quickly destroyed, so PTFE based (or similarly inert) gaskets are necessary. This is a common occurrence within chemical processing and pulp and paper applications where strong caustic or acidic solutions are transported through plastic piping systems.

Currently, there a variety of means that attempt to solve this problem:

(1) Various PTFE based gaskets (expanded or filled), fabricated as full-face design, are installed with bolt loads far in excess of the manufacturers specifications, but still below that required by the gaskets for effective sealing. Flange breakage is a common result and, where the flanges are not broken during assembly, the plants learn to live with leakage and seepage of the gaskets.

(2) These same PTFE materials are fabricated into ring type gaskets instead of full face design. Use of ring gaskets requires lower bolt torque proportional to the reduced contact area of the gaskets. Ring gaskets fit and seal inside of the flange bolt circle. Their use with plastic flanges is discouraged because of the bending moment created as the bolts are tightened. The incidence of flange breakage increases with the use of ring gaskets, and leakage/seepage typically still occurs as the gaskets are still not able to receive sufficient compressive stress.

(3) Full face elastomer gaskets with a protective PTFE envelope, or coating, have been developed for use with plastic pipe flanges and corrosive media. The PTFE coating on these gaskets increases the bolt load necessary for the elastomers to seal and, as a result, the manufacturers of these gaskets specify minimum assembly bolt torques that exceed the allowable limits of the plastic flanges. The result of this mis-match is, again, high incidence of flange breakage and leakage/seepage resulting from under-stressed gaskets. Another limitation preventing widespread use of this concept is concerns and incidents of permeation of the chemicals through the thin PTFE coating, resulting in rapid chemical deterioration of the elastomer base gasket.

(4) Modified full face gasket designs have been developed where sections of the gasket between the ID and OD are removed, thus yielding reduced compressive areas (See FIG. 1). Unfortunately, the widespread usage of these gaskets as a solution to the plastic flange sealing problems is hampered by several limitations of this concept.

a. Expanded PTFE is a preferred material for use with this design. Extremely poor rigidity results from removing large sections from the gasket while leaving a ring at the OD. This poor rigidity (floppiness) makes it very difficult to install these gaskets on larger diameter pipe flanges (~>4" NPS).

b. The minimum assembly bolt torque required to provide proper compression to these types of gaskets during assembly still exceeds the levels specified by the flange manufacturers.

As a result of the foregoing failed attempts to solve the problems, users of plastic piping systems have learned to live with and accept the poor sealing performance of PTFE based gaskets and the high incidence of flange breakage during assembly. Recently, however, with the strict recording and procedural requirements of OSHA Process Safety Management Rules, users of plastic piping systems within PSM critical areas (plant processes or areas that are subject to the OSHA rules) cannot tolerate the poor sealing performance of these joints, and more importantly they are not able to knowingly deviate from manufacturer specifications in these processes without doing engineering analyses. Specifically, plastic piping systems that specify 20 ft-lb maximum assembly bolt torque must be installed with 20 ft-lb assembly bolt torque. For plastic piping systems in PSM critical services, a better PTFE based gasket design is required that is easily installed, compatible with the processes, not subject to concerns with permeation, and finally that seals as required with bolt loads no higher than those specified by the equipment manufacturer.

A solution to this problem is obtained by "reverse engineering" a gasket. The contact area of the flanges is fixed. The minimum stress required by various suitable gasket materials is fixed. The maximum allowable bolt torques are also fixed and cannot be changed. The only variable remaining is the dimensions of the gasket and the resulting surface area. The solution lies in reduced area gasket designs that have their contact area reduced sufficiently such that the load developed by the bolts when torqued to the maximum specified value produces a compressive stress on the reduced area portion of the gasket that exceeds the minimum stress required for that material to achieve a tight seal. This must be done without creating an extreme bending moment across the flange (to prevent the brittle plastic from breaking), and the gasket must retain sufficient rigidity to allow for field assembly between tight flanges.

In one attempted solution, a reduced area gasket has a narrow sealing ring of expanded PTFE affixed to each side of a mechanically modified, creep resistant PTFE full face gasket using adhesive. (See FIGS. 2 and 2A). The dimensions of the narrow sealing ring (ID and OD) for each flange size are determined by solving the equation below for Gasket Contact Area:

Minimum Required Gasket Stress $(lb/in2)$=Total Assembly Bolt Load $(lb)$/Gasket Contact Area $(in2)$.

The sealing ring on each side of the rigid carrier is positioned inside of the bolt holes but as close to the bolt circle as possible to reduce the resulting bending moment. On designs where the rings must be positioned closer to the ID of the gasket, separate "load reaction washers" are affixed around each bolt hole to balance the compressive load and prevent an excessive bending moment from developing. (See FIGS. 2 and 2A).

SUMMARY OF THE INVENTION

It is therefore an object of the present invention to overcome the foregoing drawbacks and shortcomings of existing gasket products. Specifically, the invention is a reduced area gasket having a sealing ring that is acceptable for use in plastic piping applications with low bolt loads.

In one embodiment, there is provided a gasket for sealing a joint between a pair of pipe flanges, each flange having an inside perimeter, an outside perimeter and a plurality of apertures adapted to receive fasteners. The gasket includes a carrier disk having a inside perimeter, an outside perimeter and apertures substantially corresponding to the pair of pipe flanges. First sealing rings are mounted onto each side of the carrier disk and substantially adjacent the inside perimeter, the first sealing rings having a first thickness. Second rings are mounted onto each side of the carrier disk and outside the ring defined by the apertures, the second rings having a second thickness. The first sealing rings are at least as thick as the second rings. Alternatively, the first sealing rings are thicker than the second rings. The carrier disk may be comprised of a rigid material including compressed PTFE. The first and second rings may be comprised of expanded PTFE. Still further alternatively, the second rings may be mounted substantially adjacent to the outside perimeter.

In a further embodiment of the present invention, a gasket is provided for sealing a joint between a pair of pipe flanges, each flange having an inside perimeter, an outside perimeter, and a plurality of apertures in the flanges adapted to receive fasteners. A gasket includes a single, substantially-flat piece of material. The piece of material defines an opening that substantially corresponds to and encircles the inside perimeter of the flanges. Further, the piece of material comprises a plurality of extensions that substantially correspond to and encircle each of the flange apertures. The piece of material may be comprised of expanded PTFE.

In a further embodiment, there is a gasket for sealing a joint between a pair of pipe flanges, each flange having an inside perimeter, an outside perimeter and a plurality of apertures in the flanges adapted to receive fasteners. A gasket includes a disk having an inside perimeter, an outside perimeter and a plurality 11 of apertures adapted to receive fasteners, which substantially correspond to the flange. The disk further comprises a ring portion of sealing material, wherein the ring portion defines the inside perimeter of the disk. The disk further includes a compressed portion. The ring portion of sealing material is thicker than the compressed potion. Both portions of the disk may be comprised of PTFE. The ring portion of sealing material may be comprised of expanded PTFE.

DETAILED DESCRIPTION OF THE PREFERRED EMBODIMENTS

Figure 1:
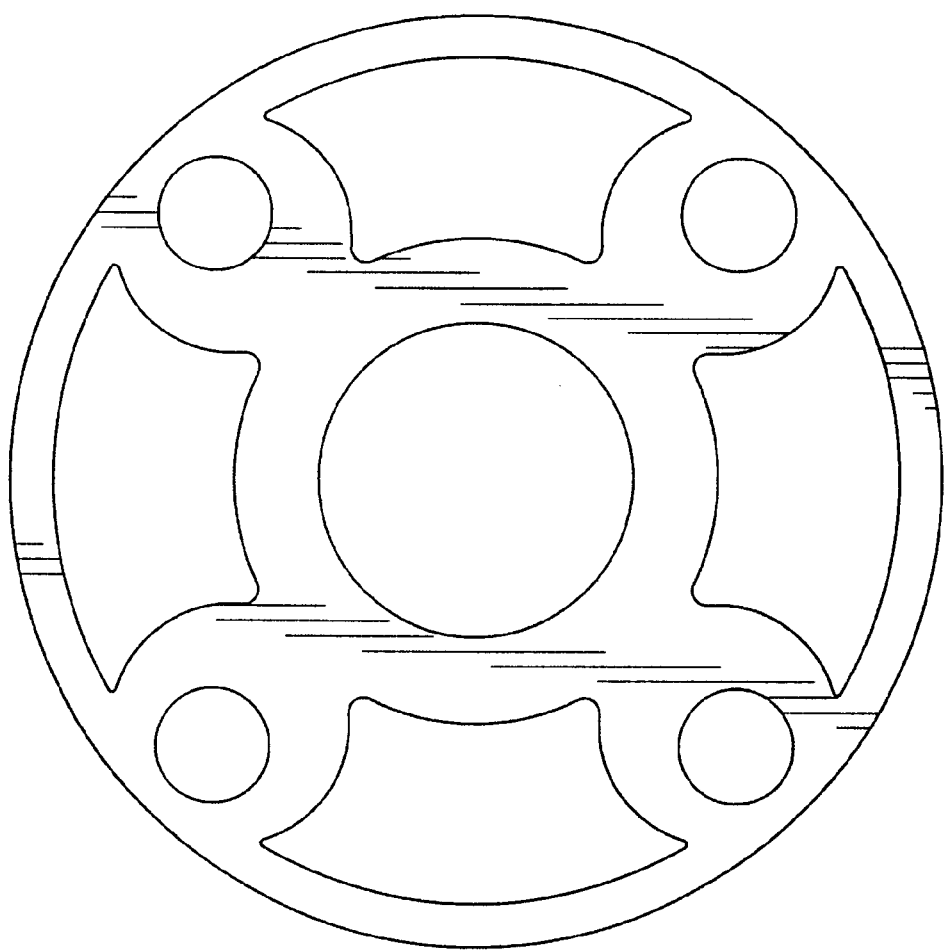
FIG. 1 is a top elevation view of a prior art reduced area gasket.
Figure 2:
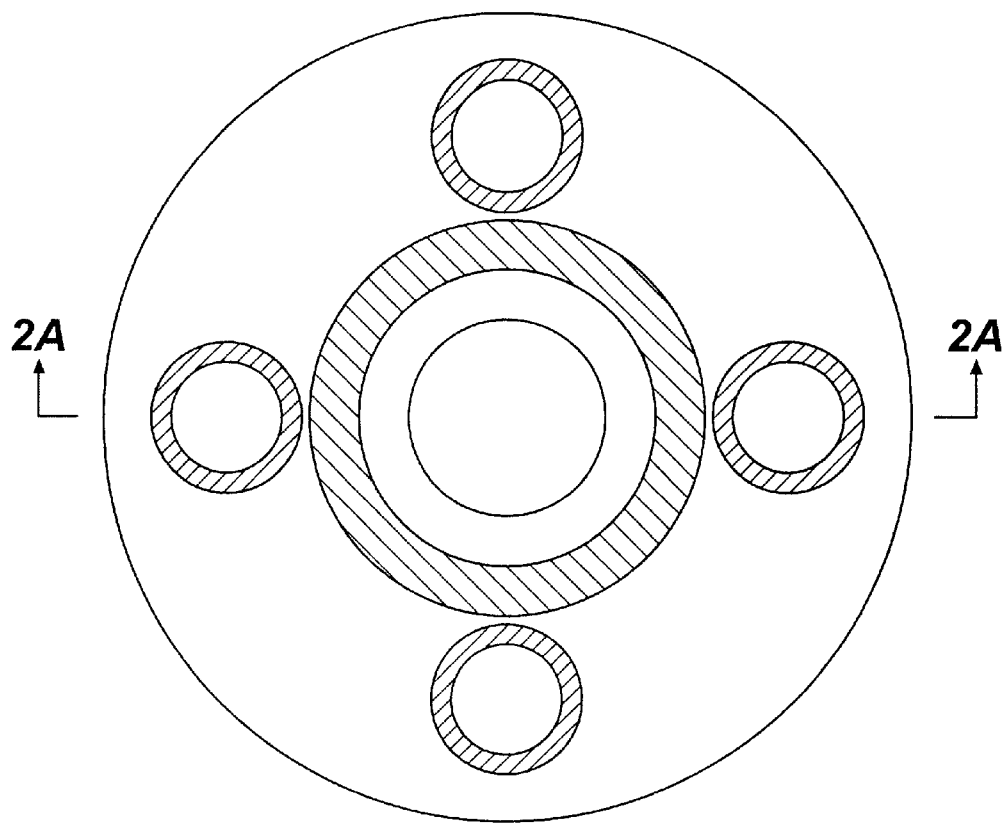
FIGS. 2 and 2A are a top elevation view and side cross sectional view respectively of a further prior art, reduced area gasket.
Figure 2A:
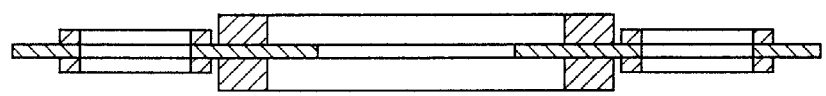

The prior art gasket designs shown in FIGS. 1, 2 and 2A have been discussed in detail in the background section. The present invention is directed to improved reduced area gasket designs.

At the outset, it should be noted that the actual gasket contact area that would make up a reduced area gasket in accordance with the present invention will be based on the calculation noted earlier herein:

Minimum Required Gasket Stress $(lb/in^2)$=Total Assembly Bolt Load $(lb)$/Gasket Contact Area $(in^2)$.

However, the invention is based on the specific location of a gasket material and in the selection of the gasket area that is removed (as compared to a full-face design).

Figure 3:
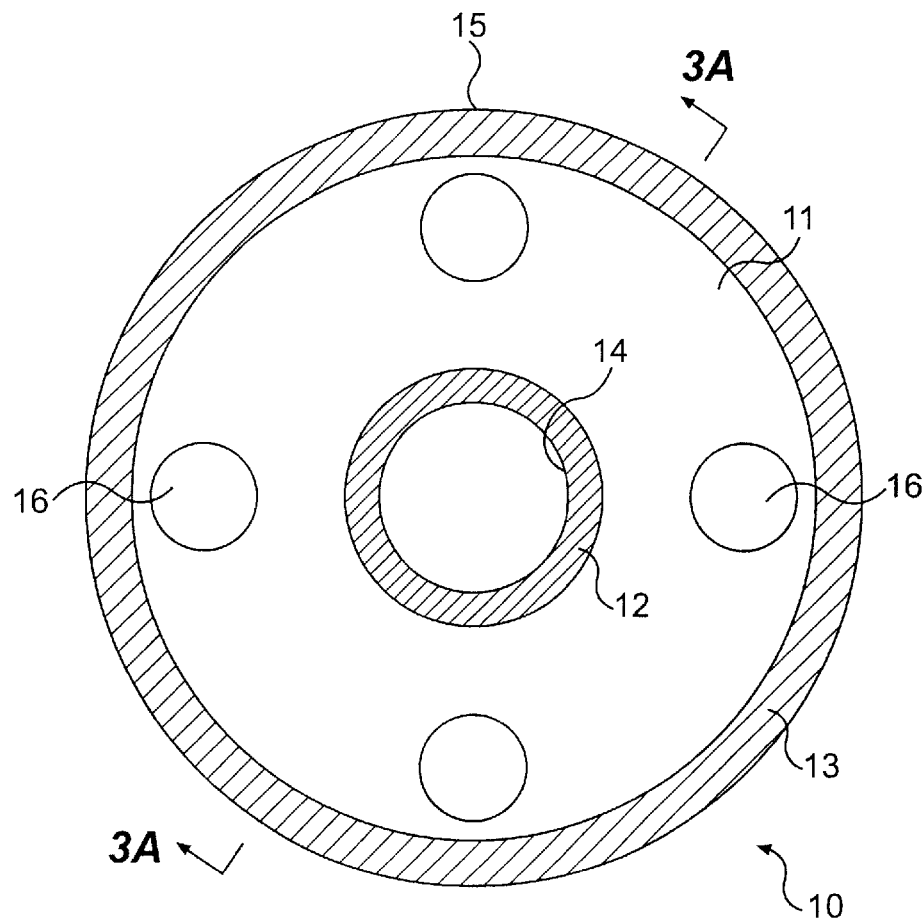
FIGS. 3 and 3A are a top elevation view and side cross sectional view respectively of a reduced area gasket in accordance with a further embodiment of the present invention.
Figure 3A:
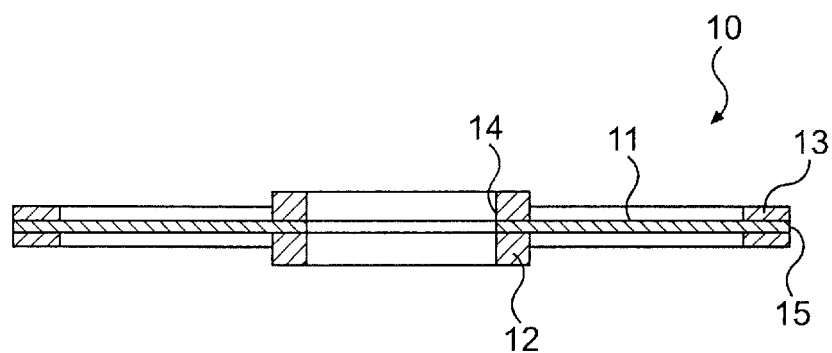

A first embodiment of the present invention is shown in FIGS. 3 and 3A. The gasket 10 is made from a rigid PTFE carrier disk 11. The carrier disk 11 has an inside diameter 14 that defines an inside perimeter and an outside diameter 15 that defines the outside perimeter of the gasket 10. The disk 11 also has apertures 16 that are bolt holes that correspond to the bolt holes in flanges in the pipe that are to be sealed by the gasket 10. The gasket 10 further includes an inside sealing ring 12 and an outside anti-rotation ring 13. An inside ring 12 is mounted onto each side of the disk 11 and substantially adjacent the inside perimeter 14. The second ring 13 is mounted on either side of the carrier disk 11 and is mounted substantially adjacent the outside perimeter 15. As is evident from the cross sectional view in FIG. 3A, the thickness of the inside sealing ring 12 is greater than the thickness of the outside ring 13, although the outer ring is not necessarily more thin than the inside ring.

The carrier disk 11 is preferably made of a rigid material in order to insure rigidity and make the gasket 10 more easily installed on a relatively larger diameter pipe flange. The rigid material may be any type of suitable gasket or carrier material including steel or rigid PTFE. Similarly, the sealing rings 12 and 13 may be made of any suitable or desirable gasket material. Preferably, however, in order to maintain the broad potential spectrum of use of the gasket and to minimize the effects of creep/cold flow, the preferred gasket material is an expanded PTFE.

In one specific example, a gasket 10 is prepared for use with an NPS 1×150 flange size. The carrier disk 11 is made of rigid PTFE and has a thickness of 1 mm. The sealing rings 12 and 13 are made of expanded PTFE and are adhered on either side to the disk 11 as shown in FIGS. 3 and 3A. The minimum required gasket stress is 2800 psi. The total assembly bolt load is 10,666 lbs. Therefore, the gasket contact area must be less than 3.8 $in^2$. The thickness of the inside sealing ring 12 is $\frac{1}{16}$ inch, and the thickness of the outside sealing ring 13 is 1 mm. The width of the inside ring 12 is $\frac{3}{16}$ inch and the width of the outside ring 13 is $\frac{1}{8}$ inch.

In the foregoing example, when compressed, the inner ring 12 is compressed to about a 30% higher stress than the outer ring 13. This is desirable from a sealing standpoint. The outer ring 13, therefore, serves no sealing purposes, but instead its primary purpose is to reduce the bending moment developed on a flange once the gasket 10 is in place and the bolts are tightened, by supporting the flange OD.

The inner ring 12 is preferably mounted substantially adjacent the inside perimeter 14. This placement reduces or eliminates any spacing between the inside walls of the pipes after they are joined. The outer ring 13 is preferably mounted substantially adjacent the outside perimeter 15 in order to facilitate visual inspection of a seal. However, the outer ring 13 may be placed anywhere outside the diameter defined by the bolt holes 16. In this way, the outer ring 13 reduces the bending moment caused by tightening the flanges around the inner sealing ring 12.

Figure 4:
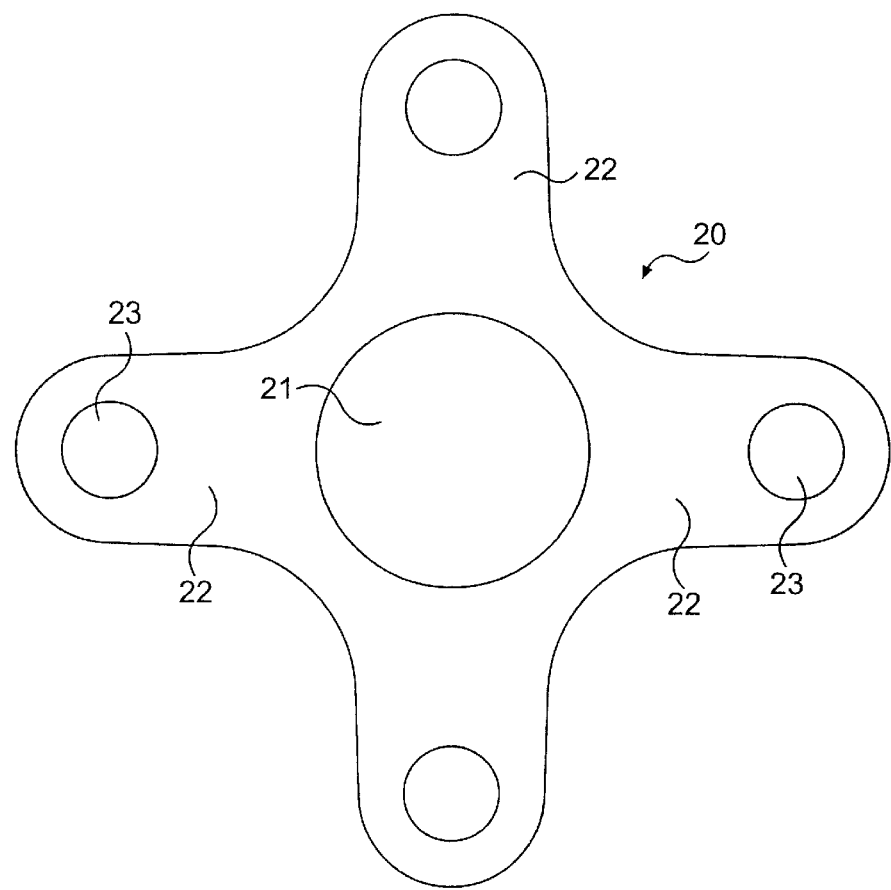
FIGS. 4–6 are top elevation views of further embodiments of the present invention.
Figure 5:
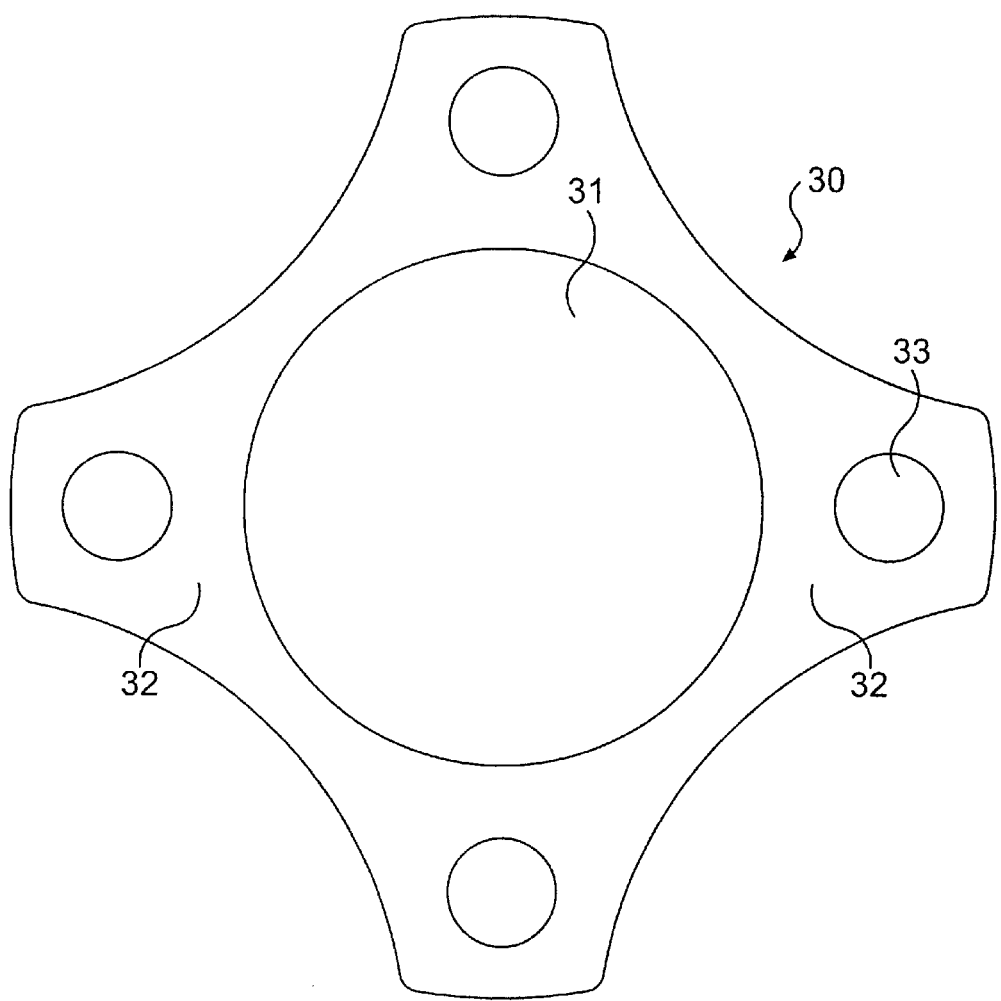
Figure 6:
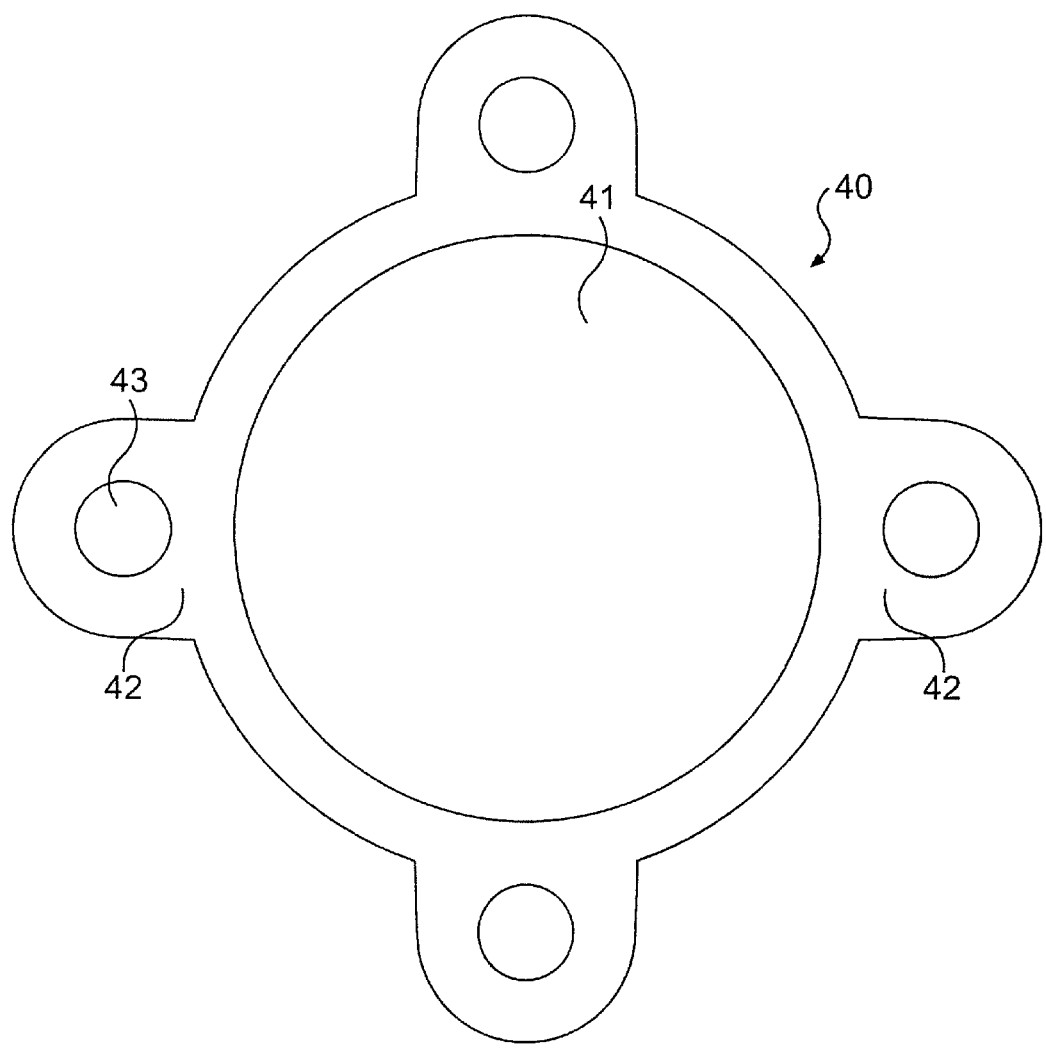

Alternative concepts of reduced area gaskets are illustrated in FIGS. 4–6. Each of these gaskets 20, 30, 40 defines an opening 21, 31, 41 that corresponds to and encircles the inside perimeter of the flange adjacent which these gaskets would be installed. In each example, the gasket 20, 30, 40 includes extensions 22, 32, 42 that protrude out from the central opening 21, 31, 41 and that encircle and define apertures 23, 33, 43 that correspond to the bolt holes in the flanges adjacent which the gaskets will be mounted. By placing gasket material around each of the bolt holes, the flange load is balanced to minimize flange bending and prevent flange breakage during installation. Preferably, each of the gaskets 20, 30 and 40 is made of a single, substantially flat piece of gasket material. In preferred embodiments, this gasket material would be expanded PTFE or any other type of appropriate gasket material. As with the other designs, the total contact area and the gasket material of the gasket must be predetermined such that the total are will receive sufficient stress from the low bolt loading of plastic flanges.

Plastic piping flange faces are not always uniformly shaped. There may be any combination of flatness, grooves, ridges or other configurations to enhance sealing. As a result, a relatively thick gasket material such as $\frac{1}{8}$ inch PTFE is used to make sure that a tight seal is obtained. The thicker materials allows a greater adaptability/conformability for sealing on imperfect or ridged flange faces.

Figure 7:
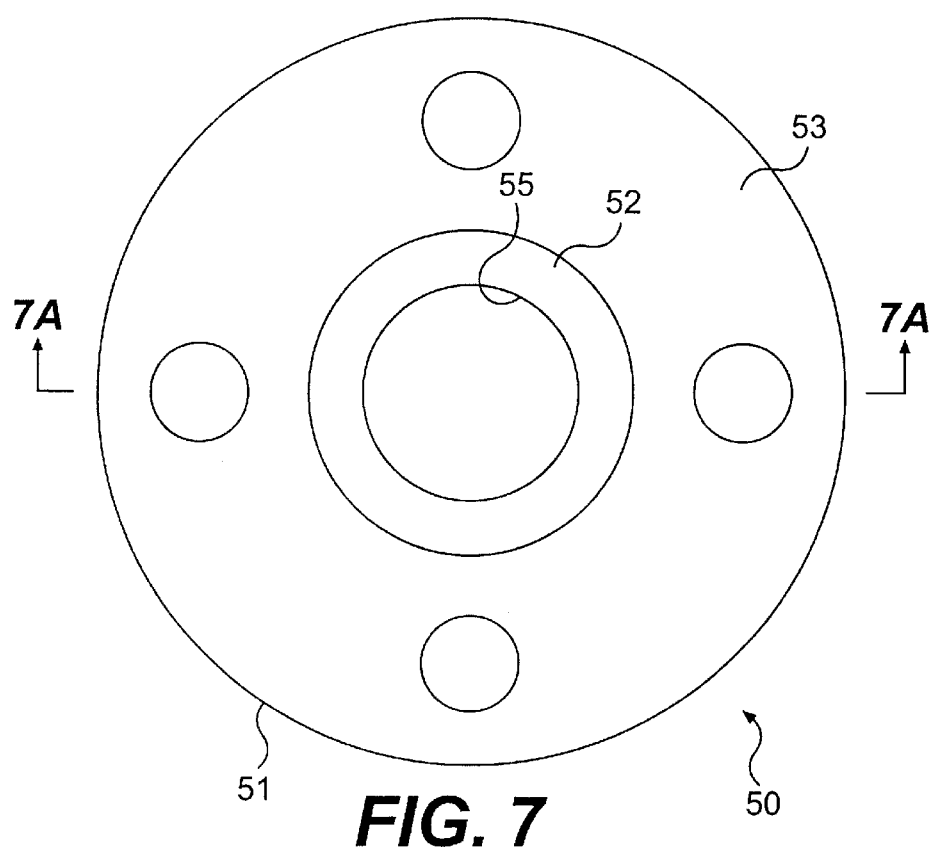
FIGS. 7 and 7A are a top elevation view and side cross sectional view of a still further embodiment of the present invention.
Figure 7A:
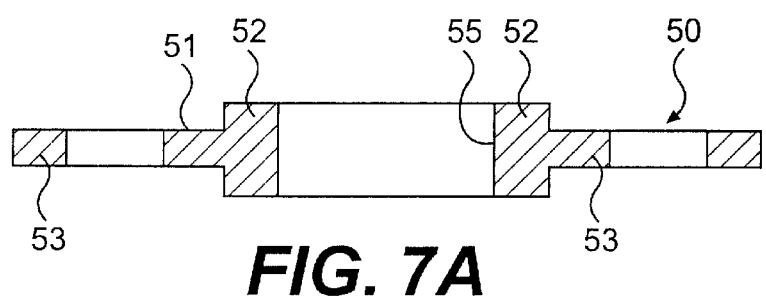

FIGS. 7 and 7A illustrate a still further embodiment of the reduced area gasket invention which requires no adhesives. Like the other examples discussed earlier, this gasket is for use in sealing a joint between a pair of pipe flanges, each flange having an inside perimeter, an outside perimeter and a plurality of apertures in the flanges adapted to receive fasteners. The gasket 50 is made up of a disk 51 having an uncompressed ring portion 52 and a compressed ring portion 53. The uncompressed portion 52 defines the inside perimeter 55 of the disk 51. The inside perimeter 55 corresponds to the inside perimeter of the pipes to be joined together. During installation of a gasket such as gasket 50, as the flange bolts are tightened, the bolt load is initially focused on the uncompressed, thicker ring portion 52. As this reduced area is compressed, the flange will then come into contact with the compressed portion 53, thus preventing flange bending and breakage. The preferred material for gasket 50 is expanded or reduced density PTFE, but any gasket material or combination of materials may be used as long as at least one material is compressible.

The illustrated example in FIGS. 7 and 7A has only an inner ring 52 of uncompressed gasket material. The pattern of uncompressed material may take any pattern such as, for instance, those shown in FIGS. 1 through 6. Other patterns are possible. Also, the thickness of the gasket material may vary over the face of the gasket. In other words, there may be different degrees of compression of the gasket face to result in a gasket having a profile of, for instance, the gasket shown in FIGS. 3 and 3A.

A gasket 50 may be made in any appropriate way. Preferably, a flat piece of uncompressed gasket material is cut into the appropriate shape of a desirable gasket—typically a full-face shape. Then, all but the sealing ring of uncompressed material 52 is densified by compression. A compression die having a desirable profile can be made so that multiple copies of effectively identical gaskets may be manufactured quickly and efficiently. Different types and thicknesses of gaskets may be formed as noted above.

Still further alternatively, a gasket similar to the one shown in FIGS. 7 and 7A may be made by tapering the portion of the gasket referred to as the compressed portion 53. In other words, reduced thickness is obtained by a tapered gasket instead of by compression. Also, gasket material can simply be removed (by cutting or grinding) to create the thinner gasket portion that corresponds to the compressed portion 53.

In the gasket alternatives described in connection with FIGS. 4 through 7A, the gasket can be made from a single piece of material, preferably expanded PTFE. A single-piece gasket eliminates the need to use adhesives (e.g., to attach a sealing ring to a carrier disk). The single-piece aspect, therefore, allows the gasket to be used in a piping application having strict purity specifications such as, for instance, in silicon handling processes.

While the invention has been described with reference to specific embodiments thereof, it will be understood that numerous variations, modifications and additional embodiments are possible, and accordingly, all such variations, modifications, and embodiments are to be regarded as being within the spirit and scope of the invention.

What is claimed is:

1. A gasket for sealing a joint between a pair of pipe flanges, each flange having an inside perimeter, an outside perimeter and a plurality of apertures in the flanges adapted to receive fasteners, the gasket consisting essentially of:
   a carrier disk having an inside perimeter, outside perimeter and apertures substantially corresponding to the pair of pipe flanges;
   first sealing rings made of gasket material and mounted onto each side of the carrier disk and substantially adjacent the inside perimeter, the first sealing rings having a first thickness;
   second rings mounted onto each side of the carrier disk and outside the ring defined by the apertures, the second rings having a second thickness; and
   wherein the first sealing rings are a least as thick as the second rings.

2. A gasket as described in claim 1, wherein the first sealing rings are thicker than the second rings.

3. A gasket as described in claim 1, wherein the carrier disk is comprised of a rigid material.

4. A gasket as described in claim 3, wherein the rigid material is comprised of compressed PTFE.

5. A gasket as described in claim 1, wherein the first and second rings are comprised of expanded PTFE.

6. A gasket as described in claim 1, wherein the second rings are mounted substantially adjacent the outside perimeter.

7. A gasket for sealing a joint between a pair of pipe flanges having an assembly bolt load, and each flange having an inside perimeter, an outside perimeter and a plurality of apertures in the flanges adapted to receive fasteners, the gasket consisting essentially of:
   a single, substantially-flat piece of material having a maximum gasket contact area and a minimum required gasket stress,
   wherein the piece of material defines an opening that encircles the inside perimeter of the flanges,
   further wherein the piece of material comprises a plurality of extensions that protrude radially outwardly and substantially correspond to and encircle each of the flange apertures,
   and still further wherein the minimum required gasket stress equals the assembly bold load divided by the maximum gasket contact area.

8. A gasket for sealing a joint as described in claim 7, wherein the piece of material comprises expanded PTFE.

9. A gasket for sealing a joint between a pair of pipe flanges, each flange having an inside perimeter, an outside perimeter and a plurality of apertures in the flanges adapted to receive fasteners, the gasket comprising:
   a disk having an inside perimeter, an outside perimeter and a plurality of apertures adapted to receive fasteners, which substantially correspond to the flange,
   the disk further comprising:
   a) a an uncompressed ring portion of sealing material, wherein the ring portion defines the inside perimeter of the disk, and
   b) a compressed portion;
   wherein the ring portion of sealing material is thicker than the compressed portion.

10. A gasket for sealing a joint as described in claim 9, wherein both portions of the disk are comprised of PTFE.

11. A gasket for sealing a joint as described in claim 9, wherein the ring portion of sealing material is comprised of expanded PTFE.

12. A gasket for sealing a joint between a pair of pipe flanges, each flange having an inside perimeter, an outside perimeter and a plurality of apertures in the flanges adapted to receive fasteners, the gasket consisting of:
   a carrier disk having an inside perimeter, outside perimeter and apertures substantially corresponding to the pair of pipe flanges;
   first sealing rings made of gasket material and mounted onto each side of the carrier disk and substantially adjacent the inside perimeter, the first sealing rings having a first thickness;
   second rings mounted onto each side of the carrier disk and outside the ring defined by the apertures, the second rings having a second thickness; and
   wherein the first sealing rings are a least as thick as the second rings.

13. A gasket for sealing a joint between a pair of pipe flanges having an assembly bolt load, and each flange having an inside perimeter, an outside perimeter and a plurality of apertures in the flanges adapted to receive fasteners, the gasket consisting of:
   a single, substantially-flat piece of material having a maximum gasket contact area and a minimum required gasket stress,
   wherein the piece of material defines an opening that encircles the inside perimeter of the flanges,
   further wherein the piece of material comprises a plurality of extensions that protrude radially outwardly and substantially correspond to and encircle each of the flange apertures,
   and still further wherein the minimum required gasket stress equals the assembly bold load divided by the maximum gasket contact area.

* * * * *